United States Patent [19]

Detuzzi

[11] Patent Number: 4,466,721

[45] Date of Patent: Aug. 21, 1984

[54] TIME LAPSE PROGRAMMER

[76] Inventor: Gregory Detuzzi, 267 Dayton Rd., Bridgeport, Conn. 06606

[21] Appl. No.: 480,509

[22] Filed: Mar. 30, 1983

[51] Int. Cl.³ ............................................ G03B 17/40
[52] U.S. Cl. .................................................. 354/267.1
[58] Field of Search ....................................... 354/267.1

[56] References Cited

U.S. PATENT DOCUMENTS 4,329,029  5/1982  Haskell ........................... 354/267.1 X

*Primary Examiner*—Michael L. Gellner
*Attorney, Agent, or Firm*—Barry R. Lipsitz

[57] ABSTRACT

A time lapse photography programmer is controlled by a microcomputer. A keyboard permits a user to enter exposure sequence, exposure duration, and exposure interval data. The time between each successive exposure (exposure interval) can be programmed to be unique for each expsoure sequence. Display means prompts a user to enter the exposure duration and interval data and displays the data entered by the user. For each exposure sequence, exposure interval data is loaded from a random access memory into a timer. After the timer has waited for a timer period defined by the exposure interval data, exposure duration data is loaded from the random access memory into the timer. A camera is then actuated to exposure film, in response to the timer, for the time period defined by the exposure duration data. At the end of each exposure, the process is repeated for each additional exposure sequence which has been programmed. An external trigger is provided to override the timer and effect an exposure immediately.

10 Claims, 6 Drawing Figures

TIME LAPSE PROGRAMMER

BACKGROUND OF THE INVENTION

The present invention relates to photography, and in particular to programmable apparatus for controlling a camera during time lapse photography.

Time lapse photography is a process which enables slowly occurring events to be studied at a faster than normal rate. This is accomplished by taking a sequence of photographs over an extended period of time, and then viewing the photographs, usually in the form of a movie, over a time period which is much shorter than the period over which the photographs were taken.

Time lapse photography is, for example, frequently used by nature enthusiasts and scientists. The nature photographer who aims his camera at a live flower bud can, by taking a series of exposures over a one or two day period, capture the blossoming of the bud into a flower. If the photographer takes on picture every couple of minutes, and then develops his film and runs these pictures, in sequence, at the rate of several frames per second, the result will be a movie where the entire development of the bud into a flower can be viewed over a period of a minute or so. Thus, events which naturally occur too slowly to understand can be viewed at an increased rate of speed by using time lapse photography.

Past equipment for enabling a photographer to engage in time lapse photography has been buly, heavy, and expensive. Such equipment put a nature photographer, for example, at a severe disadvantage because it was difficult to carry such equipment into the wildlife areas that the nature photographer desired to photograph. Further, time lapse photography apparatus available prior to the present invention has been found to be inconvenient to set up and use, and has very few user-oriented features. For example, such prior apparatus only allowed a user to set one exposure interval for the time lapse photography, with each exposure having the same duration. In other words, while such prior apparatus generally enabled a user to take as many exposures as he wanted, each exposure would be of the same duration and the amount of time ("exposure interval") between successive exposures would always be identical.

It is desirable in certain situations to take successive time lapse photographs at different exposure intervals. Thus, for example, a photographer may desire to take a photograph of a developing flower bud once every minute during the morning hours, once every 15 minutes during late morning hours, once every hour during the afternoon, and then return to shorter intervals during the evening. The photographer will, of course, choose the exposure intervals in accordance with the object being photographed, and the nature of the result he is seeking. This ability has not been present in time lapse apparatus available in the past.

Another desirable feature is the ability to manually override the time lapse apparatus, after it has been programmed, so that an exposure can be made on the spur of the moment, if necessary. An example of when such a feature is necessary is when a photographer is interested in observing, through time lapse photography, an animal's environment. In such an instance, the photographer may want to study, for example, a mole. If the photographer aims his camera at the hole in the ground in which the mole lives, he could take time lapse photographs of the mole every 15 minutes. If the mole left or entered the hole between exposures, this event would be entirely missed by the time lapse photography. If, however, a string or other trigger mechanism were placed over the hole so that the animal actuated the trigger upon entering or leaving the hole, this trigger mechanism could be used to manually override the programmed time lapse intervals and effect an exposure which would photograph the animal as it entered or left the hole. The time lapse mechanism could then continue its programmed routine of making an exposure every 15 minutes.

It would therefore be advantageous to have a time lapse programmer which is capable of being externally triggered to effect exposures outside of the programmed intervals. It would also be advantageous to have a time lapse programmer capable of taking a plurality of exposures ("exposure sequences"), at different exposure intervals between each sequence. It would also be advantageous to provide a time lapse programmer wherein the actual duration of each exposure could be programmed. Such a time lapse programmer should be portable, light weight, and economical.

The present invention relates to such a time lapse programmer.

SUMMARY OF THE INVENTION

In accordance with the present invention, programmable apparatus is provided for controlling a camera during time lapse photography. The apparatus comprises a microcomputer and data entry means coupled to the microcomputer for enabling a user to program an exposure duration, and a plurality of different exposure intervals for the time lapse exposures which are desired. Display means is coupled to the microcomputer for prompting a user to enter the exposure duration and interval data and also for displaying the data entered by the user. A random access memory is provided and is operatively associated with the microcomputer. Means are provided for loading the exposure duration and interval data into the random access memory. A timer is also provided, along with means for loading a first user programmed exposure interval from the random access memory into the timer and actuating the timer to output a control signal at the end of a time period defined by the exposure interval. Means is provided for then loading exposure duration data from the random access memory into the timer in response to the control signal, and means responsive to the timer provides a camera trigger signal for a time period defined by the exposure duration data. Means for loading successive exposure interval and duration data from said random access memory to said timer enables the production of successive camera trigger signals in accordance with the remaining exposure interval and duration data stored in the random access memory.

Since the apparatus of the present invention enables a user to program a plurality of different exposure intervals, the resulting successive time lapse exposures will not necessarily be separated by the same amount of time. Thus, the user (i.e., photographer) can tailor a specific time lapse photography session to his specific needs. Of course, the photographer could program the same exposure interval for each successive exposure, thereby effecting time lapse photography of a conventional nature.

BRIEF DESCRIPTION OF THE DRAWINGS

The present invention will be described in conjunction with the drawings, in which.

DETAILED DESCRIPTION OF A PREFERRED EMBODIMENT

The present invention relates to apparatus for controlling a camera during time lapse photography. The apparatus enables a user to photograph events that would otherwise be too time consuming or exceedingly difficult to photograph. The present apparatus is referred to as a "time lapse programmer" and utilizes a microcomputer in its operation.

Figure 1:
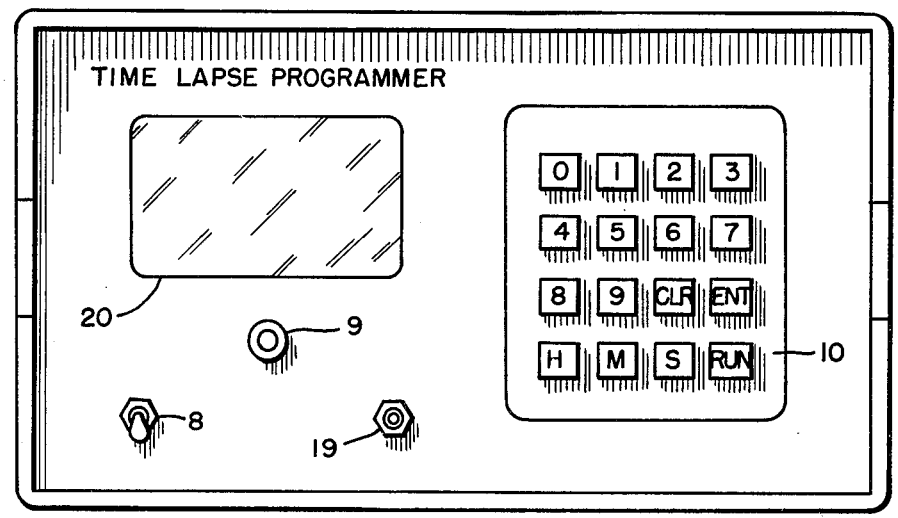
FIG. 1 is a plan view of the front panel of a time lapse programmer in accordance with the present invention.

As shown in FIG. 1, a keyboard 10 is provided for entering data, including the number of exposure sequences needed, the duration of the exposure, and the time intervals which are desired between each exposure. The present invention enables a user to program a separate time interval between each successive exposure.

A display 20 is provided, as shown in FIG. 1, for prompting a user to enter the data required by the time lapse programmer. The display also displays the data entered by the user, so that the user can confirm that the proper data is being entered. In the event the time lapse programmer is powered by a battery, low battery indicator 9 indicates when the battery must be replaced or recharged. Instead of providing indicator 9, display 20 could provide a low battery indication. The time lapse programmer is turned on and off by a power switch 8. Jack 19 is provided for coupling the camera trigger signals generated by the programmer to a camera.

Figure 2:
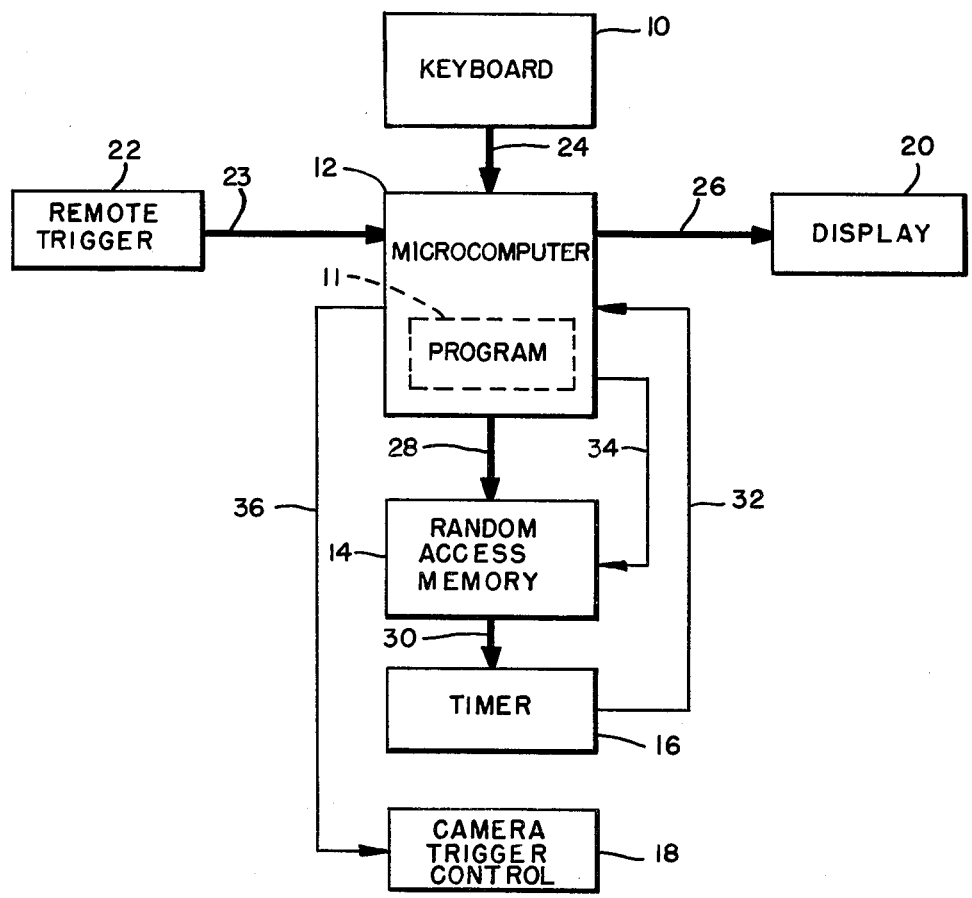
FIG. 2 is a block diagram of electronic circuitry implementing the present invention.

FIG. 2 is a block diagram which shows the structure of a time lapse programmer constructed in accordance with the present invention. A keyboard 10 is coupled to a data entry input port of microcomputer 12 through conductors 24. Microcomputer 12 contains a control program in nonvolatile memory (for example, "read only memory"), as indicated by reference numeral 11. Display 20 is coupled to a display output port of microcomputer 12 through conductors 26.

Random access memory 14 is used in conjunction with microcomputer 12 to store data indicative of the number of exposure sequences, the exposure duration, and the specific exposure intervals programmed by a user through keyboard 10. Random access memory 14 is coupled to microcomputer 12 through data bus 28. Timer 16, which is used to time a first period defined by an exposure interval stored in the random access memory, and a second period defined by the exposure duration stored in the random access memory, is coupled to random access memory 14 through data bus 30.

Control of data transfer to and from the random access memory 14 is provided by the microcomputer 12, as indicated by control line 34.

The triggering of an external camera is provided by camera trigger control 18, which, in turn, is controlled by timer 16 through microcomputer 12. In particular, during each exposure sequence, the timer times the first time period as defined by the exposure interval stored in the random access memory for the current exposure sequence. Then, the second time period (which is defined by the exposure duration data stored in the random access memory) is timed by timer 16. During the second time period, a signal on control line 32 indicates to the microcomputer 12 that the camera trigger control should be actuated to trigger an external camera. Control line 36 provides control from microcomputer 12 to camera trigger control 18.

A remote trigger 22 is another feature of the present invention. Remote trigger 22 is connected to microcomputer 12 through control line 23. When remote trigger 22 is actuated, an interrupt is produced in microcomputer 12. The interrupt calls forth a sub-routine from the program indicated by reference numeral 11 which overrides the current exposure sequence, and causes timer 16 to immediately produce a camera trigger signal regardless of the interrupted status of the timer.

Figure 3:
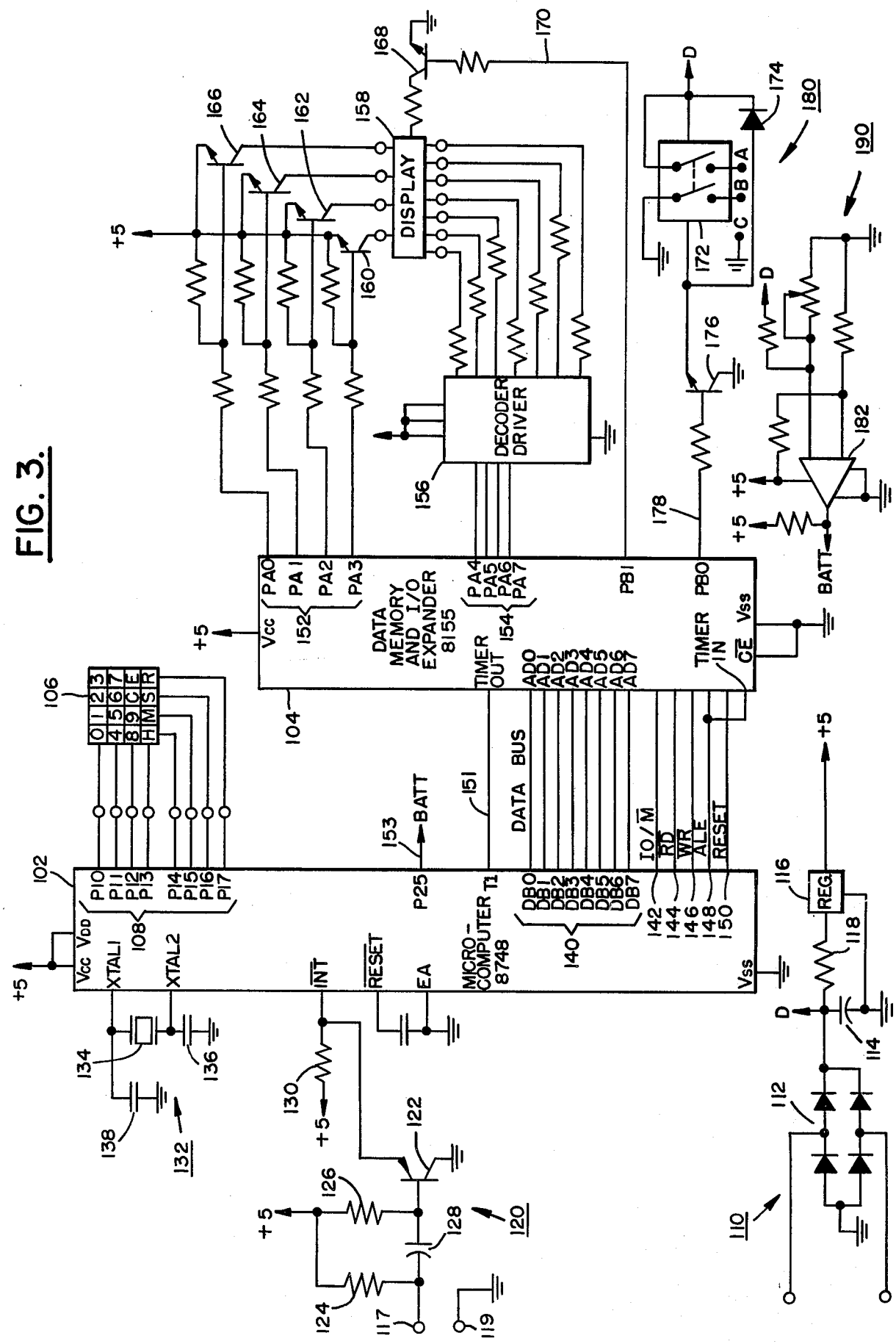
FIG. 3 is a detailed schematic diagram of electronic circuitry implementing the present invention.

FIG. 3 is a schematic diagram of electronic circuitry for implementing the block diagram of FIG. 2. It is pointed out that other implementations of the block diagram of FIG. 2 are possible, and the scope of the present invention is not meant to be limited by the following discussion of the preferred embodiment.

The time lapse programmer circuitry shown in FIG. 3 is based on a microcomputer 102 manufactured by Intel Corporation and designated as the 8748 microcomputer with EPROM. Any similar microcomputer could be substituted for the Intel 8748 shown. For example, an Intel 8049 microcomputer with ROM could be used instead of the 8748.

Microcomputer 102 contains an 8 bit bi-directional data bus 140. An 8 bit I/O port 108 is provided for data entry, as discussed hereinbelow.

Microcomputer 102 has 1000 bytes of EPROM memory. EPROM is a type of nonvolatile memory that can be programmed by a development system. It can be erased by a ultraviolet light source and be reprogrammed. Other microcomputers, such as the Intel 8049 have ROM instead of EPROM. A ROM (read only memory) differs in that the factory actually places the program on the chip. Once ROM is programmed, it cannot changed.

Intergrated circuit 104 is designed to expand the data memory, I/O (Input/Output), and timer capability of microcomputer 102. Circuit 104 can, for example, be the integrated circuit designated as the 8155 or 8156 by Intel Corporation.

Microcomputer 102 communicates with the data memory and I/O expander integrated circuit 104 through data bus 140. It also communicates control signals on lines 142, 144, 146, 148, and 150.

Line 142, designated IO/$\overline{M}$, advises integrated circuit 104 as to whether data on data bus 140 is intended for the I/O ports of integrated circuit 104, or the random access memory in integrated circuit 104. If line 142 is high, the I/O ports will be selected. If line 142 is low, the memory of integrated circuit 104 will be selected.

Control line 144, designated $\overline{RD}$, indicates to integrated circuit 104 that microcomputer 102 wants to read data from integrated circuit 104. Control line 146, designated $\overline{WR}$, instructs integrated circuit 104 that microcomputer 102 wants to read data therefrom.

Control line 148, designated ALE, indicates to integrated circuit 104 whether the information on data bus 140 is an address or data. If line 148 is high, the information on data bus 140 is an address. If line 148 is low, the information on data bus 140 is data.

Control line 150, designated RESET, places integrated circuit 104 into a known state when power is first applied to the time lapse programmer.

The control program for the time lapse programmer is stored in microcomputer 102. Microcomputer 102 includes random access memory which is used for the stack. The processor runs at a speed of two megacycles, which is controlled by a crystal controlled timing circuit 132. Crystal 134, in combination with capacitors 136 and 138 provide a stable operating frequency.

The RAM in integrated circuit 104 used to store the actual time intervals entered by a user, the number of exposure sequences, and the exposure duration time information. Integrated circuit 104 contains an internal timer which is used for the actual timing of the exposure intervals and exposure duration.

A keyboard 106 is provided for data entry to microcomputer 102. The keyboard is decoded by port 108 of microcomputer 102 in a conventional manner. In particular, line P10 of port 108 will go low and then microcomputer 102 searches for a low signal on lines P14, P15, P16, and P17. If none of these lines are low, then none of the keys in the top row of keyboard 106 (i.e., the keys marked 0, 1, 2, 3) has been pressed. If, however, a low is detected, then one of the keys in the top row has been pressed. For example, if a low is detected on line P14 of port 108, then microcomputer 102 knows that the key marked "0" has been pressed. After microcomputer 102 scans the top row, it will place line P10 of port 108 high and put line P11 of port 108 low, and then scan the second row by looking for a low on any of lines P14, P15, P16, and P17. After scanning row 2, row 3 will be scanned in the same manner, and then row 4 will be scanned. Microcomputer 102 will then cycle back to the top row of keyboard 106 and continue scanning so that it is always aware when a key is pressed.

A display is coupled to integrated circuit 104 through I/O ports 152 and 154. Display 158 is a seven-segment light emitting diode ("LED") display. The display is multiplexed at a rate of 60 cycles per second. A seven-segment decoder driver 156 is coupled to display 158 and, in turn, is driven by I/O port 154. Transistors 160, 162, 164 and 166 drive display 158 and are controlled by I/O port 152. Those skilled in the art will appreciate that the display operates in a conventional manner. In order to conserve power when the time lapse programmer is operating, display 158 is blanked out (i.e., turned off) by driving all lines from I/O port 152 high. Such power conservation is particularly important when the time lapse programmer is powered by a battery. In accordance with the control program stored in microcomputer 102, display 158 will only be blanked out after all exposure sequence, exposure duration, and exposure interval data has been entered through keyboard 106 by a user, and the key marked RUN has been pressed on keyboard 106. Transistor 168, which is controlled by output line 170 from integrated circuit 104 controls a decimal point in display 158 during the entry of the exposure duration data.

A remote trigger circuit 120 is provided to manually control the camera which is being controlled by the time lapse programmer. Thus, in effect, remote trigger circuit 120 will override any current exposure interval being timed by the time lapse programmer. Microcomputer 102 has an interrupt input (INT) which causes the microcomputer to suspend its current operation and execute a software routine to handle the interrupt. In the present invention, the interrupt is used as a remote trigger so that an external event can cause the timer to release a picture and decrement the exposure sequence count by one. The external event which will actuate remote trigger circuit 120 is, ultimately, a switch closure across terminals 117 and 119. The switch closure is AC coupled to transistor 122 to prevent multiple triggering, so that in order for a second external trigger to occur, the switch across terminals 117 and 119 (not shown) must open fully and then reclose. As soon as the interrupt service routine initiated by remote trigger circuit 120 is completed, microcomputer 102 returns to its previous point in the program, and finishes timing the interrupted interval.

When the time lapse programmer is firsst turned on, the number 1000 will be displayed on display 158 in accordance with the control program stored in microcomputer 102. At this time, the apparatus is waiting for the number of exposure sequences to be keyed in by the user. This number will be stored in the random access memory of integrated circuit 104. Display 158 will then display the number 2 01. This indicates that the apparatus is waiting for the exposure duration time to be keyed in. Once the exposure duration data is entered, it is stored in the random access memory of integrated circuit 104. Then, display 158 will display the number 3 00, indicating that the apparatus is waiting for the first exposure time interval to be entered.

All data entry is performed through keyboard 106. After the keys for the number desired to be entered have been pressed, the user confirms, through display 158, that he has keyed in the proper data, and then he presses the enter key ("ENT") to actually enter the data. The clear ("CLR") key is used to correct any errors before the data is entered.

Exposure interval times are entered in terms of hours, minutes, and seconds. Hours are entered first, when display 158 reads 3 00. After the appropriate number key(s) have been pressed, the user presses the hour ("H") key. Display 158 will then read 4 00. The user then keys in the number of minutes in the exposure interval and hits the minute ("M") key. The display will then read 5 00, and the user keys in the number of seconds in the exposure interval by pressing the appropriate number key(s) and the seconds ("S") key. When the hour, minute, and seconds data has been entered, the display will read 6 00, and the user presses the enter key to enter the data into the random access memory of integrated circuit 104. The display will then return to the 3 00 reading, and wait for the next exposure interval to be entered.

When a user has completed entering all of the exposure intervals, he presses the run key to initiate the time lapse photography. At this point, display 158 will be blanked out as explained above. The user may, however, at any time during the running of the apparatus press the "1" key on keyboard 106, which will turn display 158 back on for as long as the "1" key remains pressed.

After the run command has been issued by pressing the RUN key, the first time interval is loaded into the internal timer of integrated circuit 104. When this time has lapsed, the exposure duration time is loaded into the internal timer of integrated circuit 104. Concurrently, port PB0 of integrated circuit 104 will go high, placing a high on line 178 and turning on transistor 176. When transistor 176 turns on, relay 172 will be energized, closing the contacts operated thereby and operating an external camera connected thereto through terminals C and either A or B. As soon as the exposure duration time has lapsed, port PB0 will go low, turning off transistor 176, and the exposure sequence count will be decremented by one. The next exposure interval is then loaded into the internal timer of integrated circuit 104, and the cycle repeats until all of the exposure sequences have lapsed.

If a remote trigger occurs through trigger circuit 120, then the current time remaining in the internal timer of integrated circuit 104 is saved on the stack (the RAM of microcomputer 102). The exposure duration time is then immediately loaded into the internal timer of integrated circuit 104. Port PB0 of integrated circuit 104 will go high, turning transistor 176 on and energizing relay 172, thereby triggering the camera. When the exposure duration time has lapsed, transistor 176 and relay 172 will be turned off and the sequence count will be decremented by one. The previous time will then be taken from the stack and put back into the internal timer in integrated circuit 104 which will continue from where if left off.

The reason for decrementing the sequence count by one each time a remote trigger is effected, is to prevent the camera from taking pictures after all of the film has been used up. Thus, if a roll of 36 exposures is loaded into the camera, and 36 exposure sequences are programmed into the time lapse programmer, it will be necessary to account for any remote triggers which occur. By decrementing the exposure sequence count by one for each remote trigger, all exposures actually taken will be accounted for, and the apparatus will not attempt to take pictures after all of the film has been used.

A battery check circuit 190 monitors the power supply circuit when the time lapse programmer is powered by a battery. When the battery (connected to the terminal marked D in FIG. 3) is in a low voltage state, the output of operational amplifier 182 will go low. Microcomputer 102 looks at the output of operational amplifier 182 on port P25 and if it is low, display 158 (or, in an alternate embodiment, a low battery indicator light) will blink indicating a low battery condition.

An AC power supply can alternatively be used, in conjunction with the circuitry indicated by reference numeral 110. A full-wave bridge rectifier circuit 112 converts the input AC voltage to DC. The DC voltage is then filtered by capacitor 114 and resistor 118, and regulated by voltage regulator 116 to produce a constant +5 volt output.

The external camera controlled by the time lapse programmer can be triggered either through a cable release, or electrically if the camera is equipped with a remote release. For cameras that have a remote release, terminals B and C of relay 172 are utilized. When the time lapse programmer is generating a camera trigger signal, and thereby energizing relay 172, terminals B and C will both be shorted to ground. This will actuate the remote release of the camera.

Some cameras have what is termed a "power winder". Such power winders can activate the camera only through a cable release socket. The cable release socket attaches to a standard cable release, which is designed to activate cameras remotely.

Figure 5:
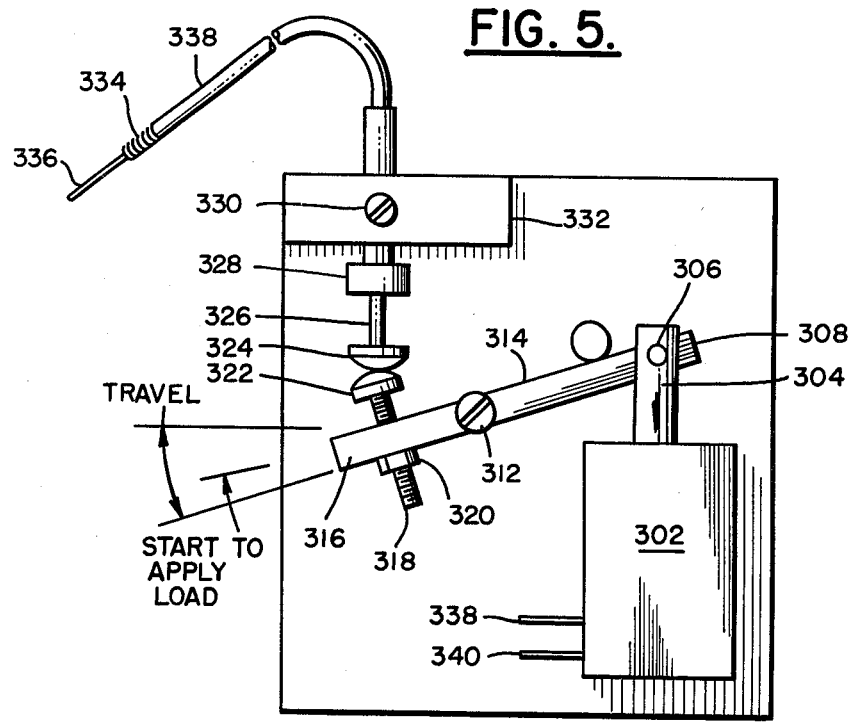
FIG. 5 is a diagram of a solenoid actuated camera cable release for use with the apparatus of the present invention.

A solenoid actuated camera cable release assembly which can be used with the time lapse programmer of the present invention is shown in FIG. 5. The camera trigger signal triggers the camera by activating a solenoid. Terminals 338 and 340 of solenoid 302 are coupled to terminals A and C, respectively, of relay 172. Thus, when relay 172 is energized by a camera trigger signal, power will be applied from the power supply for the time lapse programmer directly to solenoid 302.

When energized, solenoid 302 causes plunger 304 to retract. Plunger 304 is pivotally attached at pivot point 306 to one end 308 of a lever arm 314. Thus, when solenoid 302 is actuated, plunger 304 pulls end 308 of lever arm 314 downward. Lever arm 314 is pivoted at a intermediate point thereof by pivot 312. The pivot 312 of lever arm 314 is offset from the center of lever arm 314 to give the solenoid a mechanical advantage of approximately 2:1. The other end 316 of lever arm 314 has an adjustment screw 318 mounted thereto by a lock nut 320. Head 322 of adjustment screw 318 is adjacent cap 324 of cable release 328. Cable release 328 is mounted in block 332 by mounting screw 330. Cap 324 is attached to shaft 326, which in turn is coupled to cable 336. Cable 336 is contained within a jacket 338. One end of jacket 338 is equipped with a threaded fitting 334 which screws into the cable release socket of the camera.

When solenoid 302 is energized, an end 308 of lever arm 314 is pulled downward, and the other end 316 thereof will travel upward and actuate cable release 328. The actuation of cable release 328 will trigger the camera connected thereto.

To allow solenoid 302 is maximum pull, the load should not start to be applied until 30% of the travel of the lever arm has been reached. The camera should trigger just after the 50% point of arm travel. These points are set by adjustment screw 318.

Figure 4A:
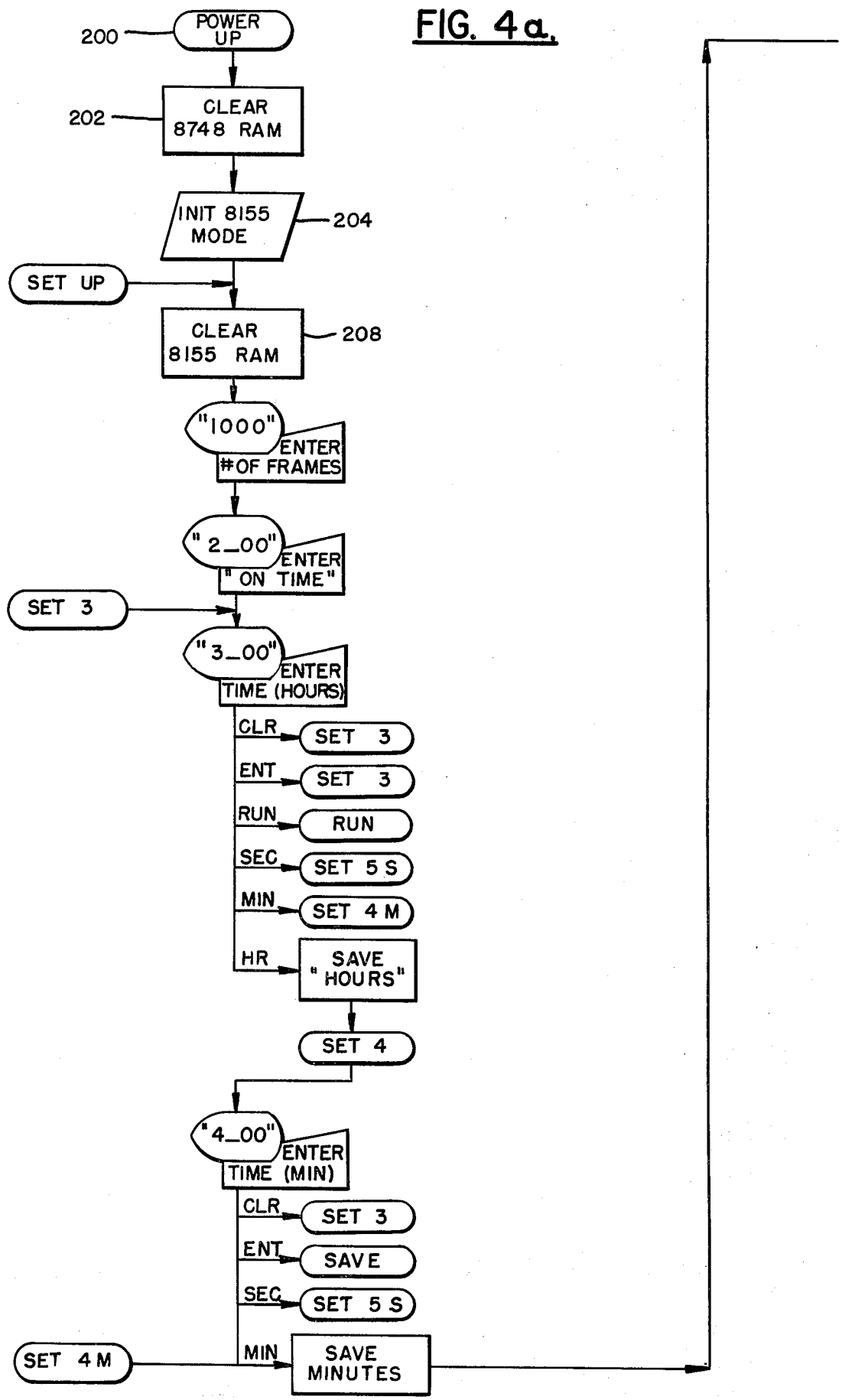
FIGS. 4a and 4b are a flow chart of the software that controls the microcomputer circuitry shown in FIG. 3.
Figure 4B:
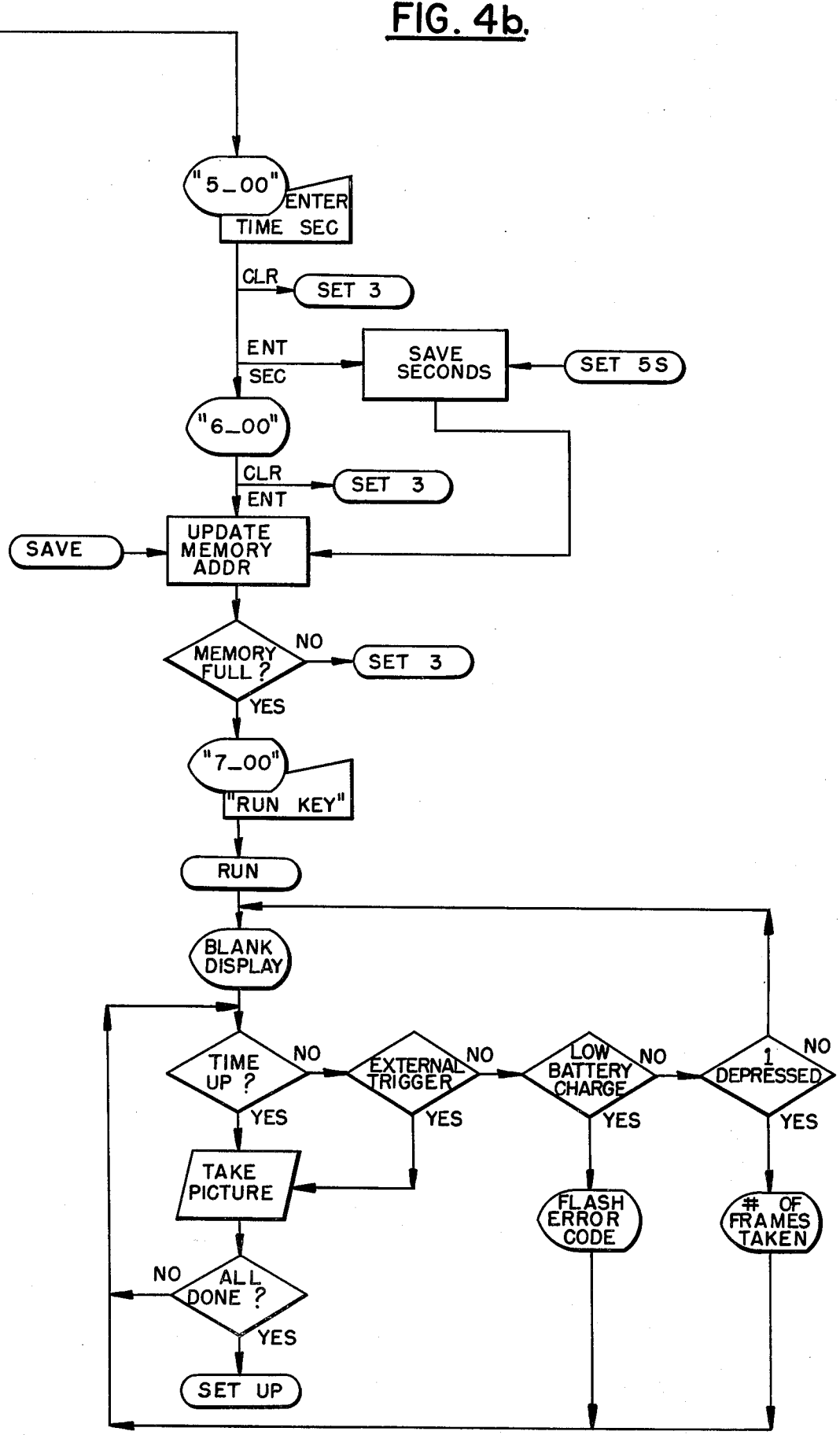

The flow chart shown in FIGS. 4a and 4b sets forth the operation of the control program stored in the read only memory of microcomputer 102. The flow chart begins at the top of FIG. 4a, and continues through the bottom of FIG. 4b. At block 200, the time lapse programmer is powered up. Then at block 202, the random access memory of microcomputer 102 is cleared. At 204 integrated circuit 104 is initialized and the random access memory thereof is cleared at 208. The program proceeds through the remaining blocks in accordance with the time lapse programmer description set forth hereinabove.

An appendix attached hereto is a detailed printout of the program contained in the read only memory of microcomputer 102. This program allows up to 9999 exposure sequences to be programmed at up to 75 different intervals. Each interval can be from 1 second to 99 hours, programmable in 1 second increments. The exposure duration can be programmed from 0.1 to 9.9 seconds, in 0.1 second increments. After the first 75 exposure intervals programmed have been effected, each additional interval will be equal to the last programmed interval.

While this invention has been disclosed and described with reference to a preferred embodiment thereof, it will be apparent that variations and modifications may be made therein, and it is intended in the following claims to cover each such variation and modification as falls within the true spirit and scope of the invention.

I claim:

1. Programmable apparatus for controlling a camera during time lapse photography comprising:

a microcomputer;

data entry means coupled to said microcomputer for enabling a user to program an exposure duration, and a plurality of different exposure intervals;

display means coupled to said microcomputer for prompting a user to enter exposure duration and interval data, and for displaying the data entered by the user;

random access memory operatively associated with said microcomputer;

means for loading said exposure duration and interval data into said random access memory;

a timer;

means for loading a first user programmed exposure interval from said random access memory into said timer and actuating said timer to output a control signal at the end of a time period defined by said exposure interval;

means for loading exposure duration data from said random access memory into said timer in response to said control signal;

means responsive to said timer for providing a camera trigger signal for a time period defined by said exposure duration data; and means for loading successive user programmed exposure interval and exposure duration data from said random access memory to said timer to produce successive camera trigger signals in accordance with the remaining exposure interval and duration data stored in said random access memory.

2. The apparatus of claim 1 wherein said data entry means comprises a keyboard.

3. The apparatus of claim 1 further comprising remote trigger means coupled to said microcomputer for causing said timer to immediately produce a camera trigger signal regardless of the prior status of the timer.

4. The apparatus of claim 1 further comprising a relay having a first pair of normally open switch contacts, means for energizing said relay to close said contacts in response to said camera trigger signal, and means for coupling said contacts to a camera to effect an exposure when said contacts close.

5. The apparatus of claim 1 further comprising a solenoid actuated camera cable release, and means for energizing said solenoid to actuate the camera cable release in response to said camera trigger signal.

6. The apparatus of claim 5 wherein said solenoid actuated camera cable release comprises:

a fixed solenoid having a reciprocating plunger;

a lever arm pivotally connected at one end thereof to said plunger;

means for pivotally mounting said lever arm at an intermediate portion thereof to a fixed point;

a camera cable release mounted adjacent the other end of said lever arm for actuation thereby when said solenoid is energized.

7. Programmable apparatus for controlling a camera during time lapse photography comprising:

a microcomputer having a data entry input port, a display output port, a bi-directional data bus, random access memory, and a timer;

data entry means coupled to said data entry input port for enabling a user to enter the number of exposure sequences desired, the exposure duration desired, and a separate exposure interval for each exposure sequence;

display means coupled to said display output port for prompting a user to enter the exposure sequence, exposure duration, and exposure interval data, and for displaying the data entered by the user;

means for loading, via said bi-directional data bus, the exposure sequence, exposure duration, and exposure interval data into said random access memory;

means for keeping a count of the number of programmed exposure sequences remaining after each exposure;

means for controlling the operation of said timer during each exposure sequence to execute, in order, the following steps:

(a) time a first period defined by the exposure interval stored in said random access memory for the current exposure sequence, then (b) time a second period defined by the exposure duration stored in said random access memory for the current exposure sequence, and then (c) repeat steps (a) and (b) for each exposure sequence which has been entered; and means for providing a camera trigger signal throughout each second period.

8. The apparatus of claim 7 further comprising:

an interrupt input to said microcomputer;

remote trigger means for activating said interrupt input to produce an interrupt;

means responsive to an interrupt for causing said timer to immediately produce a camera trigger signal regardless of the prior status of the timer; and means for restoring normal timer operation, and decrementing the exposure sequence count by one, after the termination of said immediately produced camera trigger signal.

9. The apparatus of claim 8 further comprising electronic circuit means for testing the voltage output of a battery which powers said apparatus, and for providing an error signal when said voltage level drops below a predetermined value.

10. The apparatus of claim 9 further comprising means, responsive to said error signal and operatively associated with said microcomputer, for terminating the production of further camera trigger signals and providing an error display.

* * * * *